United States Patent [19]
Chan

[11] Patent Number: 5,458,197
[45] Date of Patent: Oct. 17, 1995

[54] WELL CLEANOUT SYSTEM AND METHOD

[75] Inventor: Albert F. Chan, Plano, Tex.

[73] Assignee: Atlantic Richfield Company, Los Angeles, Calif.

[21] Appl. No.: 148,736

[22] Filed: Nov. 5, 1993

Related U.S. Application Data

[63] Continuation-in-part of Ser. No. 863,529, Apr. 6, 1992, abandoned, which is a continuation of Ser. No. 647,867, Jan. 30, 1991, abandoned.

[51] Int. Cl.$^6$ ....................................................... F21B 37/00
[52] U.S. Cl. ........................... 166/304; 166/312; 507/209; 507/211; 507/213; 507/216; 507/215; 507/225; 507/226; 507/227; 507/228; 507/261; 507/276
[58] Field of Search ..................................... 166/304, 312, 166/291; 252/8.552

[56] References Cited

U.S. PATENT DOCUMENTS

| | | | |
|---|---|---|---|
| 3,070,162 | 12/1962 | Barnard, Jr. | 166/312 X |
| 3,529,666 | 9/1970 | Crowe | 166/312 X |
| 3,653,441 | 4/1972 | Tuttle | 166/291 |
| 3,756,319 | 9/1973 | Holm et al. | 166/312 X |
| 3,884,302 | 5/1975 | Messenger | 166/291 |
| 4,423,781 | 1/1984 | Thomas | 166/312 |
| 4,528,106 | 7/1985 | Grolitzer | 252/8.554 |
| 4,565,647 | 1/1986 | Llenado | 252/3 X |
| 4,648,453 | 3/1987 | Nagra et al. | 166/304 X |
| 4,681,164 | 7/1987 | Stacks | 166/312 X |
| 5,030,366 | 7/1991 | Wilson et al. | 252/8.551 |

*Primary Examiner*—George A. Suchfield
*Attorney, Agent, or Firm*—Michael E. Martin

[57] ABSTRACT

Oil or water based drilling muds, together with other wellbore contaminants such as pipe thread sealants and lubricants are displaced from the well and the wellbore surfaces are cleaned by a system of four serially pumped fluid pills. The first stage fluid pill is a weighted spacer having an alkyl polyglycoside surfactant, a dispersant, a weighting agent and a viscosifier. The second stage pill is a drive fluid formed by water and a viscous polymer gel such as clarified xanthan gum having a viscosity/shear rate characteristic which minimizes mixing of the drive fluid pill with the displacement fluid pill. A buffer fluid pill comprising completion brine is interposed between the drive fluid pill and a fourth stage comprising a wash fluid pill using an organic solvent or a caustic alkyl polyglycoside as a final cleaning stage. The densities of the pills are controlled to minimize mixing and fingering of one pill into the other. The wellbore cleanout system minimizes contamination of the well and also minimizes the volume of completion brine which must be discarded after displacement of the system through the well.

19 Claims, 2 Drawing Sheets

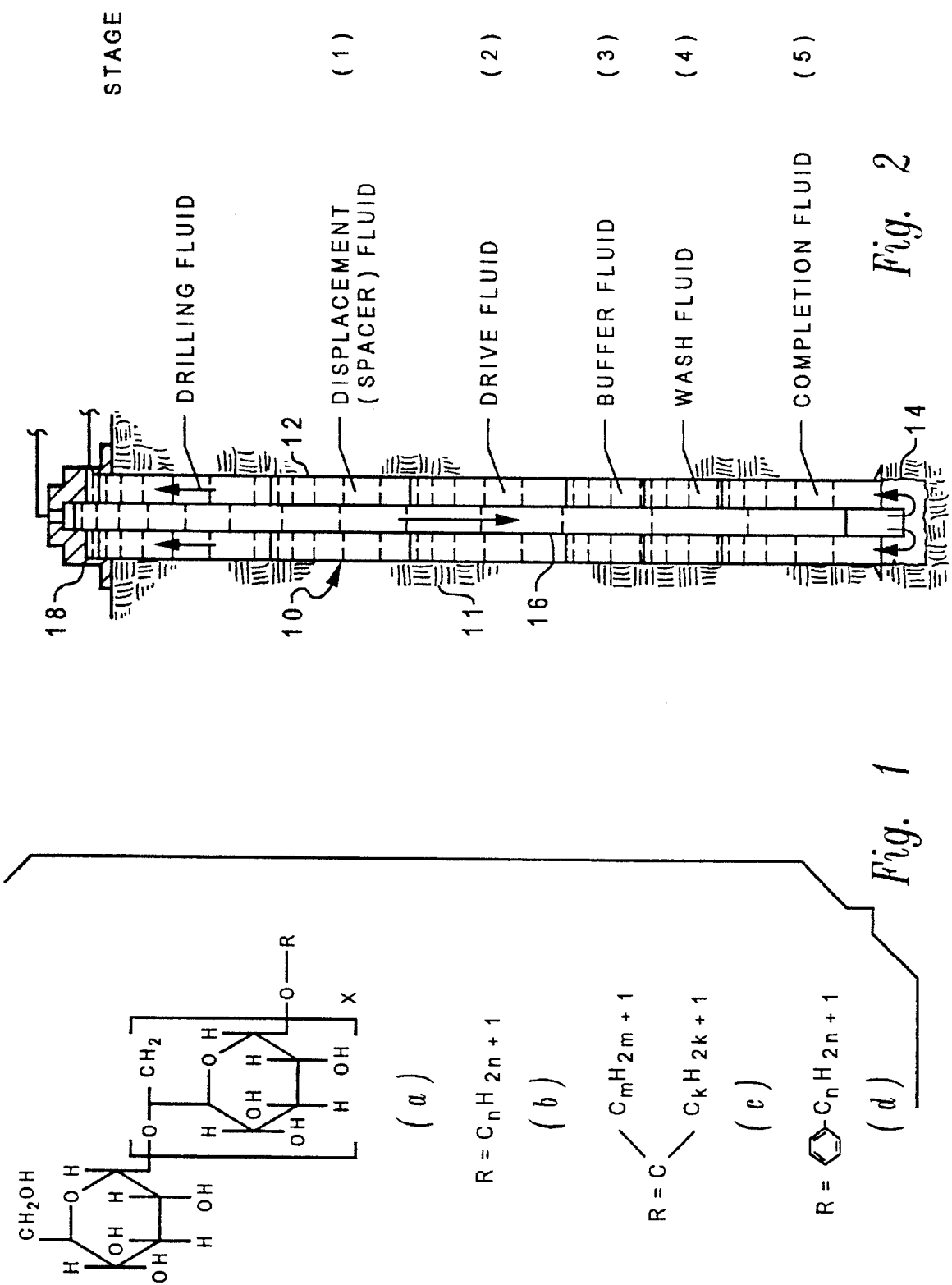

WELL CLEANOUT SYSTEM AND METHOD

CROSS-REFERENCE TO RELATED APPLICATION

This application is a continuation-in-part of U.S. Patent application Ser. No. 07/863,529, filed Apr. 6, 1992, now abandoned, which is a continuation of U.S. Patent application Ser. No. 07/647,867, filed Jan. 30, 1991, now abandoned.

BACKGROUND OF THE INVENTION

1. Field of the Invention

The present invention pertains to a well cleanout system comprising plural serially-injected fluid compositions and a method for removing contaminants from cased and open-hole wellbores using such compositions.

2. Background

In the drilling and workover of oil and gas wells and certain types of fluid-injection wells, it is necessary and desirable to remove contaminants such as drilling fluids, pipe sealants and lubricants and other residue from the wellbore. Failure to perform an effective cleanout operation can result in contamination and plugging of an earth formation from which fluids are desired to be produced. Moreover, wells which have already produced subterranean fluids, including wells having so-called open-hole wellbores, periodically benefit from cleaning of the wellbore to remove contaminants such as iron sulfide precipitates, injection water contaminants and filter cake of certain fluids which have been injected into the wellbore but which have not been removed as a result of producing fluids from the wellbore.

The objectives in wellbore cleanout processes are primarily focused on complete displacement of drilling fluids or other fluids occupying the wellbore and removal of drilling fluid residue and other contaminants occupying the wellbore. In this regard, a displacement fluid, sometimes called a spacer fluid, should be similar in density to the drilling or other fluid occupying the wellbore to prevent substantial commingling of these fluids during the displacement process. Still further, the displacement fluid should contain an agent which is effective in removing contaminants adhering to the wellbore walls as well as certain solids which may be loosely in residence in the wellbore.

Still further, an effective drive fluid for driving the displacement fluid through the wellbore is one which will minimize mixing with the displacement fluid and has a "piston" effect for driving the displacement fluid through the wellbore space and out of the wellbore without substantial mixing with the drive fluid. This fluid should have viscoelastic and pseudo plastic time independent properties to provide the piston-like displacement effect and gel-like suspension characteristics.

Still further, a desirable well cleanout system and method requires a buffer to prevent mixing of the viscous gel drive fluid with a final stage comprising a cleaning or wash pill to provide the final stage of cleanout.

Prior art efforts to provide effective well cleanout processes have resulted in unsatisfactory quality and speed of cleanout as well as unwanted mixing and failure of the fluid slugs or pills displaced through the wellbore to provide the cleanout process. However, the objectives and desiderata outlined above have been met with the improved system and method of the present invention.

SUMMARY OF THE INVENTION

The present invention provides an improved wellbore cleanout system comprising plural fluid compositions which are sequentially displaced through a wellbore to remove drilling fluid and other contaminants from the wellbore walls and the wellbore space.

In accordance with an important aspect of the present invention, a wellbore cleanout system is provided which utilizes plural slugs or pills of fluid which are injected into the wellbore to displace the drilling fluid, without substantial mixing, while maintaining an interface which is miscible or near miscible with the drilling fluid and while still further protecting the integrity of a displacement or spacer pill or slug from uncontrolled dilution and dispersion.

In accordance with yet a further aspect of the present invention, a wellbore cleanout system is provided which (a) is operable to accommodate gradual density and viscosity transition between drilling fluid or the like being displaced from the wellbore and a completion fluid which will occupy the wellbore after the displacement and cleaning process, (b) provide fast-acting and turbulent cleaning action, and (c) reduce the volume of components of the system and of completion fluid which must be discarded due to contamination.

In particular, a wellbore cleanout system is provided which includes a unique displacement or spacer fluid composition which is pumped into the wellbore to displace drilling fluid and to remove drilling fluid from the wellbore walls together with other contaminants. This displacement fluid advantageously includes an effective cleaning composition utilizing primarily a glucose based surfactant having a lipophilic portion comprising a linear alkyl chain, or a branch alkyl chain (which may contain one or more double bonds or a hydroxy group) or an alkyl phenol chain. A cosurfactant may be used such as linear or branch alkyl alcohol ethoxylates, alkyl phenol ethoxylates, amphoteric, anionic, and cationic surfactants.

Still further, the system includes a viscous fluid slug or pill which provides a piston-like driving effect for displacing the displacement fluid without significant mixing with the displacement fluid thereby protecting the displacement fluid from uncontrolled dilution and dispersion while also providing a gradual density transition.

Still further, the invention includes a buffer fluid slug or pill which serves as a buffer providing a gradual viscosity transition between the viscous drive fluid slug and a washing or cleaning pill or slug which includes a solvent or surfactant and which may be displaced through the wellbore in turbulent flow to provide a final step in the cleaning process.

The invention contemplates the use of a series of four slugs or pills of fluids to provide the optimum displacement and cleanout process which is particularly useful in cleaning out oil-based or water-based muds, although not limited thereto, minimize the dilution and dispersion of each of the pills or slugs of fluid, provide a gradual density and viscosity transition between the fluid being displaced from the wellbore and each of the pills or slugs as well as the final completion fluid which is to occupy the wellbore, provide fast-acting, turbulent cleaning action in the wellbore and minimize the volume of completion fluid, in particular, which must be discarded due to contamination. The above-noted objectives, advantages and superior features of the present invention will be further appreciated by those skilled in the art upon reading the detailed description which follows in conjunction with the drawing.

BRIEF DESCRIPTION OF THE DRAWING

FIG. 1 is a diagram of the molecular structure of a preferred surfactant;

FIG. 2 is a schematic diagram of a wellbore showing one general arrangement of the various fluid slugs or pills which are pumped through the wellbore in accordance with the present invention.

DESCRIPTION OF PREFERRED EMBODIMENTS

Figure 3:
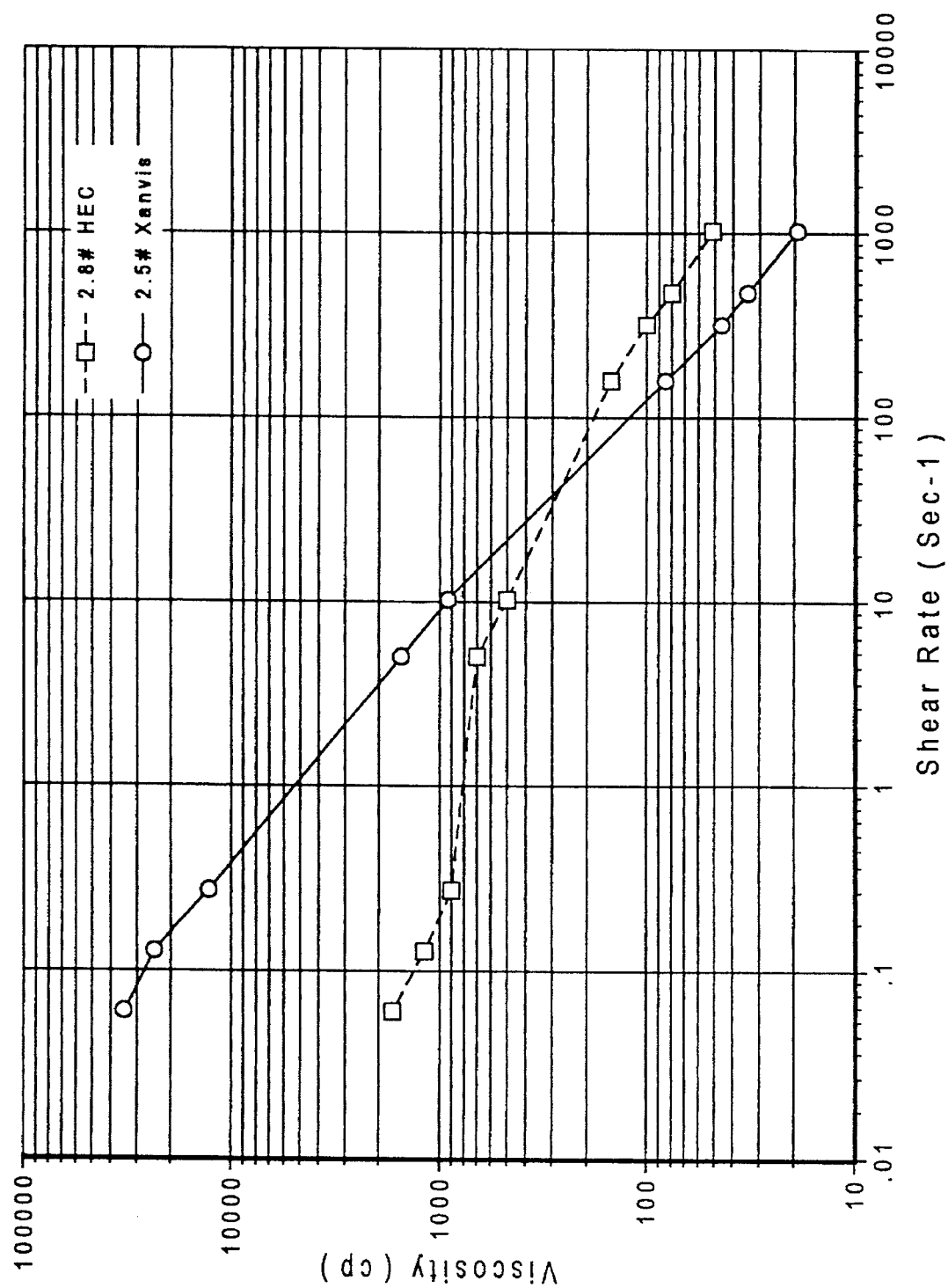
FIG. 3 is a diagram showing certain characteristics of a preferred drive fluid in accordance with the present invention.

In the description which follows, like parts are marked throughout the specification and drawing with the same reference numerals, respectively. The drawing figures are not to scale and certain elements are shown in generalized or somewhat schematic form in the interest of clarity and conciseness.

The above-described problems and desiderata in cleanout of subterranean wellbores have been resolved with two primary factors which are central to the success of the cleanout system and method of the present invention. Gradual density transition between the slugs or pills of the fluids is advantageous in that minimal commingling of fluids occurs. Secondly, an advantageous composition is provided for the drive fluid which displaces the displacement fluid resulting in better viscosity control than prior art compositions. Still further, fluid turbulence in the wash slugs or pills is provided with improved cleaning effect. Lastly, improved cleaning slugs or pills are provided which use alkyl polyglycoside cleaning agents and non-aromatic solvents, both of which significantly enhance the quality of the wellbore cleaning and the efficiency of displacement of wellbore fluids and other contaminants.

In accordance with the teaching of U.S. Patent application Ser. No. 07/863,529, assigned to the assignee of the present invention, it has been discovered that certain alkyl polyglycoside surfactants, which are non-ionic in nature, and which utilize the many hydroxyl groups in the polysaccharide chain to achieve hydro philicity, in combination with caustic materials such as sodium hydroxide and potassium hydroxide, may be particularly effective in a cleanout fluid for removing from wellbores oil-based drilling mud residue, pipe thread sealants and lubricants, hydrocarbon substances such as diesel oil, mineral oil and crude oil and other naturally-occurring formation fluids. The oil-soluble portion of the alkyl polyglycoside surfactant may be controlled by the alkyl chain length which can be varied from C4 to C18. Each saccharide group is typically equivalent to 5–7 ethylene oxide groups, and therefore is very effective in rendering water-soluble properties to alkyl polyglycoside surfactants even at high temperatures, high salinity and hardness conditions such as found in seawater.

FIG. 1(a) shows the structure of the alkyl polyglycoside molecule that contains a hydrophilic group which is derived from starch and is comprised of one or more anhydroglucose units. There are two ether oxygens and three hydroxyl groups per glucose unit, plus a terminal hydroxyl group. The lipophilic portion of the molecule resides in the alkyl chain wherein R can be a linear alkyl chain, as indicated in FIG. 1(b), and wherein n preferably ranges from 4 to 18. Alternatively, R can be a branch alkyl chain, as indicated in FIG. 1(c), wherein m and k are odd numbers and m is equal to k+2, or an alkyl phenol chain as indicated in FIG. 1(d). The polymerization reaction can provide oligomer distributions from x=0 up to x=10.

The concentration of the alkyl polyglycoside surfactant for use in the first or displacement fluid stage may be in the range of about 1.0% to 10.0% by weight of the total composition for use in displacing both oil-based drilling muds and water-based drilling muds. The water solubility and oil solubility requirements can be optimized by choosing the appropriate alkyl chain length or a mixture of alkyl chain length and/or the polysac-charide number in the molecule. A cosurfactant such as a linear alkyl ethoxylate or an alkyl phenol ethoxylate may be included in the total concentration of surfactant. The cosurfactant may also be selected from amphoteric, anionic and cationic type surfactants. The weight concentration of the cosurfactant in the total should be in the range of 0.0% to 3.0%. In other words, if the total concentration of surfactant is 5.0% and the concentration of the cosurfactant is 0.25%, the concentration of the alkyl polyglycoside surfactant would be 4.75% by weight of the total composition.

The displacement fluid which is to include the alkyl polyglycoside surfactant, and a cosurfactant, if any, may be one of those described in U.S. Pat. No. 5,030,366, issued Jul. 9, 1991 to Wilson, et al, and assigned to the assignee of the present invention. In particular, a suitable displacement or "spacer" fluid should comprise fresh water mixed with a composition which may include the following substances provided in the quantities described as part of a dry mixture: sulfonated styrene maleic anhydride copolymer in the amount of about 10% to 50% by weight, about 40% to 90% by weight of a gell agent such as bentonite and about 1% to about 20% by weight of a viscosifier selected from a group consisting of Welan gum, hydroxyethylcellulose, carboxymethyl hydroxyethylcellulose, attapulgite, partially hydrolized polyacrylamide, sepiolite, bentonite, acrylamide polymers, acrylic acid polymers, 2-acrylamido-2-methylpropane sulfonic acid copolymers, polyvinyl pyrrolidinone and silicate extenders.

The quantity of the displacement fluid which is pumped into a typical wellbore should occupy at least about 400 feet to 1200 feet of wellbore space during the displacement and cleanout procedure. The displacement fluid should have a density not significantly less than the density of the drilling fluid or other fluid in the wellbore that is to be displaced during the displacement and cleanout procedure. It has been determined that, if the density of the displacement fluid pill is within about 2.0 lbs. per gallon less than the density of the drilling or other fluid in the wellbore, an insignificant mixing or commingling of fluids will take place in a normal cleanout procedure in accordance with the invention.

The second slug or pill of fluid displaced through the wellbore functions primarily as a piston-like or driving element for the slug or pill of displacement fluid. The second fluid pill is preferably a viscous gel solution which has a relatively steep slope of viscosity versus shear rate and also a very high viscosity at low or near-zero shear rate, such as 0.1 reciprocal seconds or less. In accordance with the present invention, the use of a biopolymer gel solution such as clarified xanthan gum has been discovered to have superior performance characteristics. The xanthan gum has improved rheological properties over synthetic polymers such as HEC (hydroxyethyl cellulose) and polyacrylamides. FIG. 3 illustrates the characteristic of shear rate in reciprocal seconds ($Sec^{-1}$) versus viscosity in centipoises (cp) at 160° F. for gels made up of 2.5 lbs. of clarified xanthan gum per barrel of water (42 U.S. gallons per barrel), in particular a brand known as "XANVIS", and 2.8 lbs. of HEC per barrel of water. The rheological behaviors would be similar in potassium chloride or sodium chloride brine.

It will be noted from FIG. 3 that the viscosities at relatively high shear rates (100 to 1000 reciprocal seconds) of the "XANVIS" gel are lower (in a range of about 20 cp to 150 cp) than that attainable with HEC while the viscosities at low shear rates (0.1 or lower reciprocal seconds) are significantly higher (in a range of about 27,000 cp to 35,000 cp). This shear rate versus viscosity characteristic enables the drive fluid pill or slug to proceed through the wellbore with minimal turbulence while also maintaining a fairly uniform "piston-like" characteristic to displace the displacement fluid without substantial mixing therewith. In fact, the density of the drive fluid pill may be significantly less than that of the displacement fluid. For example, if the displacement fluid has a density of about 15.0 to 16.0 lbs. per gallon, the drive fluid pill may have a density of about 8.4 to 10.0 lbs. per gallon. The viscosity of the gel drive fluid will minimize mixing of the drive fluid pill with the displacement fluid pill during the procedure because some initial mixing of drive fluid with displacement fluid will create a transition zone of intermediate density fluid thereby minimizing further mixing. The density of the drive fluid pill may be modified by adding sodium chloride or a similar salt to the pill.

The well cleanout system and method contemplates the use of a third stage fluid pill which is preferably a chloride brine or seawater which can be provided in densities up to about 10.0 lbs. per gallon using sodium chloride so as to mitigate any large density differential between the second stage pill and the third stage pill as well as between the third stage pill and a fourth stage pill. Because of a fairly critical temperature characteristic, bromide brines are not suitable for use as the third stage or buffer pill adjacent to a drive fluid pill which includes a xanthan gum polymer. Bromide ions will tend to reduce the rheological stability of the xanthan gum significantly and destroy its viscosity qualities at elevated temperatures, typically above 60° C. The selection of the third stage fluid described immediately above is based on the assumption that some mixing of this buffer fluid with the second stage drive fluid will occur. Accordingly, the placement of a third stage fluid pill between the drive fluid pill and a fourth stage fluid pill, which will complete the cleanout procedure, is desirable.

The system and method of the present invention further contemplates the use of a fourth stage fluid composition forming a slug or pill which is pumped into the wellbore behind the third stage or buffer pill. The fourth stage is preferably made up of a mixture of a brine, such as mentioned above, and a solvent or caustic surfactant solution which will complete the cleanout procedure. For cleanout of oil-based drilling fluids, the fourth stage slug or pill preferably should include an organic solvent which is capable of fast-action cleaning of any residual oil-based mud films, caky deposits and pipe thread compound remaining in the wellbore. The pumping rate of the fourth stage pill is selected to perform this operation in turbulent flow. The major criteria in selecting the solvent for the fourth stage fluid pill are that the solvent be nontoxic, have a high flash point, have a large solubility of oil-based mud and hydrocarbon oils and also have good dispersibility in brine.

The solvent should comprise from 20% to 50% of the fourth stage pill, by volume. Commercially available organic solvents such as solvents sold under the trade names "SUPER PICKLE" (sold by Wellflow Technologies, Inc. of Houston, Texas) and "PDR-1000" (sold by Rig-Chem, Inc. of Houma, Louisiana) have been found to be suitable. Also, solvents such as "BWCE-101" (available from BW Mud, Ltd. of Aberdeen, Scotland) and "NATURE SOL" (available from Chem-Rich of Lafayette, Louisiana) are suitable. These solvents are d-Limonene citrus-based solvents.

If the wash fluid pill is to be used in a well in which water-based drilling fluids are to be displaced and cleaned from the wellbore surfaces, the wash fluid may comprise water with an alkyl polyglycoside surfactant and a caustic agent to bring the pH in the range of 12.5 to 13.5. This caustic solution may be provided by adding a caustic agent such as sodium hydroxide or potassium hydroxide to the solution.

The concentration of alkyl polyglycoside surfactants in the wash fluid should typically be in the range of about 1.0% to 10.0% by weight of the total composition and preferably 1.0% to 5.0%. The concentration of caustic materials may be in the range of about 1.0% to 10.0% by weight of the total composition. As with the displacement fluid, the water solubility and oil solubility requirements can be optimized by choosing the appropriate alkyl chain length or a mixture of alkyl chain length and/or the glycoside number in the molecule. The linear alkyl ethoxylate or alkyl phenol ethoxylate may be included as a cosurfactant. The wash fluid may include selected amounts of 0.25% to 1.5% by weight of low molecular weight polymers such as sulfonated styrene maleic anhydride, sulfonated vinyl toluene maleic anhydride or sulfonated isobutylene maleic anhydride as dispersants to improve the dispersion of solid particles.

A major advantage of the four-stage fluid system with the four separate fluid slugs or pills described hereinabove is that when a completion brine is pumped into and through a well behind the fourth stage slug or pill, only a minimal volume of such brine has to be discarded due to polymer contamination. In a conventional three-stage fluid slug cleanout system, for example, (displacement fluid, followed by wash fluid, followed by viscous drive fluid) there is always a large disposal volume of brine as well as a substantial delay in taking the brine surface returns because of the substantial mixing zone created by fingering of the completion brine into the viscous drive fluid. The presence of polymer gel in completion brine returns can plug off the brine filtration system, thereby incurring additional expense and delaying well operations.

A typical well displacement and cleanout procedure will now be described utilizing the system and method of the invention. FIG. 2 illustrates the well cleanout system being displaced through a well 10 extending in an earth formation 11 and having a cased portion 12, an open-hole portion 14 and a tubing string 16 extending within the well from a wellhead 18. The decision on whether or not to pump the four-stage displacement and cleanout system fluids down through a tubing string and up through the well annulus, as shown in FIG. 2, or vice versa, may be based on several factors. Generally, if the density of the final completion fluid (i.e. the fifth stage) is relatively high, it would be desirable to pump the fluid slugs, and the completion fluid thereafter, down through the tubing string and up through the annulus to minimize commingling of the completion fluid with the cleanout system fluid pills, particularly the fourth stage. Another reason for pumping the well cleanout system down through the tubing string would be to minimize the chance of plugging any small-diameter orifices or ports such as might be found in a drill bit if the system was pumped through a drillstring. Also, removal of bottom-of-the-well solids contaminants may also be easier accomplished by pumping the treatment system down through the tubing string and up through the annulus.

On the other hand, if the density of the completion fluid is relatively low, this would favor pumping the cleanout fluid pills serially down through the well annulus and up through the tubing string.

The first stage of the cleanout system comprising the drilling fluid displacement slug or pill is preferably composed of the aforementioned compositions of sulfonated styrene maleic anhydride, water, a weighting agent, a viscosifier, an alkyl polyglycoside surfactant and a cosurfactant to provide displacement of the drilling fluid, particularly oil-based or water-based drilling muds, provide some miscibility at the interface of the drilling fluid and the first stage slug or pill to avoid the formation of any emulsion of adverse viscosities and to provide cleaning of the wellbore surfaces comprising the inner and outer surfaces of the tubing string, the open hole wall surface of a wellbore and/or the inner wall surfaces of the well casing. The displacement fluid also functions to entrain and remove solids particles loosely residing in the wellbore or adhered to the drilling fluid or oil coatings on the wellbore wall surfaces. The first stage fluid may be made up in densities ranging from 9.0 to 19.0 lbs. per gallon and should be approximately the same or slightly less dense than the drilling fluid that is being displaced, as previously mentioned.

If the cleanout system is being pumped down through a so-called workstring or a drillstring, such a tubing string may be reciprocated and/or rotated during the injection and displacement process to enhance the cleaning action of the first stage pill. All blending and storage tanks and flowlines leading to the well should be cleaned in advance. A sufficient quantity of the first stage pill should be made up to occupy about 400 feet to 1200 feet of wellbore annulus. Typically, the displacement fluid pill should be in the amount of 20 barrels to 60 barrels volume (42 U.S. gallons per barrel). The surfactant formulation used in the displacement fluid pill preferably includes an alkyl polyglycoside surfactant known as APG 600 or Glucopon 600 available from Henkel Corporation of Amber, Pa., and a small amount of a non-ionic surfactant sold under the trade name Neodol 91–2.5 available from Shell Chemical Company of Houston, Texas. Typically, the displacement fluid composition comprises 1.0% to 5.0% by weight of total active surfactants. Moreover, the ratio of the alkyl polyglycoside surfactant to the nonionic cosurfactant should be in the range of 5:1 to 2:1 by weight. Example compositions are shown in Table I.

TABLE I

| APG ® 600* | Neodol ® 91–2.5 | Total Active Surfactant |
|---|---|---|
| 3.8% v | 1.0% v | 3% w |
| 4.8% v | 0.4% v | 3% w |

*50% active material

By way of example, the displacement fluid pill in the amount of 33 barrels may be made up using 22.5 barrels of fresh water and 350 lbs. of a dry spacer mix in accordance with the compositions described hereinabove or in U.S. Pat. No. 5,030,366 and available from Halliburton Energy Services as their Alpha spacer mix. Preferably the spacer mix is added to the water slowly at an interval of ten minutes for each 50 lb. bag while shearing the mixture with maximum pumping rate for fifteen to twenty minutes. A weighting agent in the amount of 13,000 lbs. is then injected into the pill solution in a blending and storage tank while blending and circulating with a pump for about 15 minutes.

Subsequently, 8.0 gallons of "NEDOL 91–2.5" are added together with 41.0 gallons of "GLUCOPEN 600" alkyl polyglycoside surfactant. Preferably, the alkyl polyglycoside surfactant is added last, about one-half hour before pumping into the wellbore, to avoid foaming.

The drive fluid pill (second stage) is thereafter made up in a blending tank in the amount of 33 barrels, at a density of 10.0 lbs. per gallon, by adding citric acid to 29.5 bbl of water to lower the pH to about 4.0. Seventy-five pounds of "XANVIS" brand xanthan gum polymer are then added slowly at the rate of 12.5 lbs. per minute while mixing to disperse the polymer. At this point, a diluted caustic soda solution may be added slowly to raise the pH of the drive fluid to the range of about 9.0 to 10.0 until it becomes thickened. In order to bring the density of the drive fluid pill up to 10.0 lbs. per gallon, 3600 lbs. of sodium chloride are then added to the pill solution. This solution is sheared at maximum pumping rate for about fifteen to thirty minutes to help it yield its full viscosity. The quantity of drive fluid pill made up should also occupy from 400 feet to 1200 feet of wellbore space.

A sufficient quantity of completion fluid (brine) is made up for use as the third or buffer stage, preferably having a density of 8.5 lbs. per gallon and of a total volume equivalent to about 600 feet to 1200 feet of wellbore annular space. The fourth or wash stage fluid may also be made by adding about 6.3 barrels of organic solvent, i.e. "SUPER PICKLE" or "CE101", to 14.0 barrels of completion brine. A sufficient quantity of the buffer fluid slug or pill must be used to assure that any residual polymer gel resulting from mixing of the drive fluid pill with the buffer pill does not contaminate the wash pill.

Displacement into the well is started by pumping the displacement fluid pill, followed by pumping the drive fluid pill, followed by pumping the buffer fluid pill and finally pumping the wash fluid pill. A 4.0 barrel per minute pumping rate is preferably maintained until all four stages are pumped into the wellbore. Pumping should continue until total displacement of oil-based drilling fluid or other drilling fluid is completed. The drilling fluid or "mud" is routed to a disposal tank upon its return from the wellbore and the displacement fluid pill, the drive fluid pill and the buffer and wash fluid pills are also routed to a disposal tank for proper disposal upon their return from the wellbore.

With the foregoing procedure, contamination of the completion brine (fifth stage) is expected to be no more than 10 to 20 barrels. Once the brine returns look clear, they may be taken to a conventional filtration unit while circulation is continued at a relatively high rate to displace additional one or two wellbore volumes, or until the brine clarity reads 30 NTU's or less.

It should be mentioned that the drilling fluid, for example, an oil-based drilling mud composition, may be modified during the drilling process to facilitate the cleanout procedure. For example, when nearing total hole depth, preparation for the cleanout and completion operation may be carried out by increasing the oil-water volumetric ratio to 80/20 or higher, if possible, while reducing the excess lime content to a minimum of 0.0 to 1.0 lbs. per barrel. The rheology of oil-based mud, that is the plastic viscosity, yield point and gel strength should also be modified so that the yield point is less than the displacement fluid pill. Secondly, a casing or tubing scraper may be run such as the "HEDGE HOG" brand casing brush similar to that described in U.S. Pat. No. 4,896,720. The drilling fluid should be maintained in circulation during the scraper run and the workstring or drillstring may be rotated and reciprocated also during displacement.

Those skilled in the art will appreciate from the foregoing that an improved wellbore cleanout system and method have been provided by the present invention. The first stage comprising the displacement fluid pill provides a density balanced displacement of drilling fluids with substantial cleaning of the tubing and casing surfaces or the wellbore surface of an open-hole wellbore. Each of the fluid stages or pills are prevented from undergoing uncontrolled dilution and dispersion with a gradual density and viscosity transition and a fast-acting and turbulent cleaning action is provided by the fourth stage pill. The entire system not only provides improved cleaning action but minimizes the volume of completion fluid which must be discarded due to contamination.

Although a preferred embodiment of a system and method for cleaning wellbores has been described hereinabove, those skilled in the art will recognize that various substitutions and modifications may be made to the system and method without departing from the scope and spirit of the invention as recited in the appended claims.

What is claimed is:

1. A method for displacing fluid from and cleaning a wellbore space of a subterranean well having a tubing string extending therewithin, comprising the steps of:
    circulating a displacement fluid into said well to displace fluid in said well therefrom;
    circulating a drive fluid into said well for driving said displacement fluid through said well;
    circulating a buffer fluid into said well after said drive fluid; and
    circulating a wash fluid for at least one of water-based and oil-based wellbore contaminants into said well after said buffer fluid, said wash fluid being provided to include at least one of an organic solvent and a d-Limonene base solvent.

2. The method set forth in claim 1 including the step of:
    circulating a completion fluid into said well to displace the first four mentioned fluids through said well.

3. The method set forth in claim 1 including the step of:
    providing said displacement fluid with a surfactant in the amount of about 1.0% to 10.0% by weight of said displacement fluid.

4. The method set forth in claim 3 including the step of:
    providing said surfactant to include a hydrophilic group comprised of one or more anhydrous glucose units and a lipophilic portion selected from a group consisting of a linear alkyl chain, a branch alkyl chain which may contain one or more double bonds or a hydroxy group and an alkyl phenol chain.

5. The method set forth in claim 3 including the step of:
    providing a cosurfactant selected from a group consisting of linear alkyl alcohol ethoxylate, alkyl phenol ethoxylate, amphoteric, anionic, and cationic surfactants.

6. The method set forth in claim 3 including the step of:
    providing said displacement fluid with a dispersant selected from a group consisting of sulfonated styrene maleic anhydride, sulfonated vinyl toluene maleic anhydride and sulfonated isobutylene maleic anhydride.

7. The method set forth in claim 3 including the step of:
    providing said displacement fluid with one or more viscosifiers selected from a group consisting of Welan gum, hydroxyethylcellulose, carboxymethyl hydroxyethylcellulose, attapulgite, partially hydrolized polyacrylamide, sepiolite, bentonite, acrylamide polymers, acrylic acid polymers, 2-acrylamido-2-methylpropane sulfonic acid copolymers, polyvinyl pyrrolidone and silicate extenders.

8. The method set forth in claim 1 including the step of:
    providing said drive fluid as a viscous gel comprising water and xanthan gum.

9. The method set forth in claim 1 including the step of:
    providing said buffer fluid as a quantity of brine.

10. A method for displacing fluid from and cleaning a wellbore space of a subterranean well having a tubing string extending therewithin, comprising the steps of:
    circulating a displacement fluid into said well to displace fluid in said well therefrom;
    circulating a drive fluid into said well for driving said displacement fluid through said well;
    circulating a buffer fluid into said well after said drive fluid; and
    circulating a wash fluid for at least one of water-based and oil-based wellbore contaminants into said well after said buffer fluid, said wash fluid being provided to include at least one of an alkyl polyglycoside surfactant, a cosurfactant and a caustic agent.

11. The method set forth in claim 10 including the step of:
    providing said caustic agent as one of sodium hydroxide and potassium hydroxide.

12. The method set forth in claim 10 including the step of:
    circulating a completion fluid into said well to displace the first four mentioned fluids through said well.

13. The method set forth in claim 10 including the step of:
    providing said displacement fluid with a surfactant in the amount of about 1.0% to about 10.0% by weight of said displacement fluid.

14. The method set forth in claim 13 including the step of:
    providing said surfactant to include a hydrophilic group comprised of one or more anhydrous glucose units and lipophilic portion selected from a group consisting of a linear alkyl chain, a branch alkyl chain which may contain one or more double bonds or a hydroxy group and an alkyl phenol chain.

15. The method set forth in claim 13 including the step of:
    providing a cosurfactant selected from a group consisting of linear alkyl alcohol ethoxylate, alkyl phenol ethoxylate, amphoteric, anionic, and cationic surfactants.

16. The method set forth in claim 13 including the step of:
    providing said displacement fluid with a dispersant selected from a group consisting of sulfonated styrene maleic anhydride, sulfonated vinyl toluene maleic anhydride and sulfonated isobutylene maleic anhydride.

17. The method set forth in claim 13 including the step of:
    providing said displacement fluid with one or more viscosifiers selected from a group consisting of Welan gum, hydroxyethylcellulose, carboxymethyl hydroxyethylcellulose, attapulgite, partially hydrolized polyacrylamide, sepiolite, bentonite, acrylamide polymers, acrylic acid polymers, 2-acrylamido-2-methylpropane sulfonic acid copolymers, polyvinyl pyrrolidone and silicate extenders.

18. The method set forth in claim 10 including the step of:
    providing said drive fluid as a viscous gel comprising water and xanthan gum.

19. The method set forth in claim 10 including the step of:
    providing said buffer fluid as a quantity of brine.

* * * * *